United States Patent [19]

Davis

[11] Patent Number: 5,582,363
[45] Date of Patent: Dec. 10, 1996

[54] AIRCRAFT INSTRUMENT PANEL COVER

[76] Inventor: Don Davis, 49 Nieto Ave., Long Beach, Calif. 90803

[21] Appl. No.: 499,039

[22] Filed: Jul. 6, 1995

[51] Int. Cl.$^6$ ............ E05B 13/10; B60R 25/02; G05G 5/00; B60K 37/06
[52] U.S. Cl. ............ 244/1 R; 70/57; 70/183; 70/200; 70/212; 244/121; 180/90
[58] Field of Search ............ 244/1 R, 121; 70/54, 55, 56, 57, 158, 163, 183, 200, 202, 203, 212; 296/72, 73; 180/90

[56] References Cited

U.S. PATENT DOCUMENTS

| | | | |
|---|---|---|---|
| 3,843,173 | 10/1974 | Harrell | 70/212 |
| 3,913,701 | 10/1975 | Williams | 180/90 |
| 4,299,361 | 11/1981 | Webb | 70/57 |
| 4,475,366 | 10/1984 | Marneris | 180/90 |
| 4,549,625 | 10/1985 | Tindall | 180/90 |
| 4,759,424 | 7/1988 | Rolleri | 180/90 |
| 4,767,153 | 8/1988 | Kawasaki et al. | 180/90 |
| 4,888,968 | 12/1989 | Azvedo | 180/90 |
| 5,082,213 | 1/1992 | Torres | 70/200 |
| 5,230,398 | 7/1993 | Frisbee | 180/90 |

*Primary Examiner*—Andres Kashnikow
*Assistant Examiner*—Virna L. Mojica
*Attorney, Agent, or Firm*—Charles H. Thomas

[57] ABSTRACT

A guard shield is provided as a protective security device in the cockpit of an aircraft to prevent instruments in the aircraft control panel from being removed by thieves. The guard shield is formed of a flat, laterally expansive, rigid plate with a pair of parallel slots defined in its lower edge. The slots extend upwardly into the interior of the plate and terminate in blind ends. The slots are laterally spaced from each other a distance equal to the distance of the separation of the steering columns for the steering yokes utilized by the pilot and copilot. The guard shield is mounted so as to rest upon the steering columns with the steering columns residing at the upper extremities of the slots in the blind ends thereof. A locking mechanism is employed to hold the guard shield closely adjacent to the surface of the instrument control panel, so as to prevent the removal of instruments therefrom. The locking mechanism may include a padlock and possibly also a throttle cover mounted upon the throttle which projects outwardly and rearwardly from the control panel of the aircraft. An aperture in the guard shield is provided to allow the throttle to pass therethrough, and the locking mechanism may be secured to the throttle or to the steering columns.

6 Claims, 5 Drawing Sheets

AIRCRAFT INSTRUMENT PANEL COVER

BACKGROUND OF THE INVENTION

1. Field of the Invention

The present invention relates to a method and apparatus for shielding instruments in an aircraft cockpit control panel.

2. Description of the Prior Art

Numerous aircraft, especially smaller, private aircraft, must frequently be left in unattended ground storage locations when not in use. Some private aircraft are left in unattended hangers while others are stored at airport tiedown locations without any structure about them.

Even the smallest aircraft currently flown include sophisticated electronic-instruments which are mounted in the cockpits of the aircraft in an instrument control panel. The control panel is located immediately below the aircraft windshield so as to provide maximum visibility of the instruments to a pilot and copilot. The seats for the pilot and copilot are positioned a short distance to the rear of the control panel in the aircraft cockpit. The steering controls for both the pilot and copilot positions include a steering column that projects rearwardly from the aircraft instrument control panel a short distance. The steering columns are connected to a steering yoke having handgrips that are held laterally spaced from each other on opposite sides of the steering column.

While in the early days of powered flight the instruments employed in aircraft control panels were relatively unsophisticated and not particularly expensive, over the years a multitude of different complex instruments have been developed for use in manned flight of even small aircraft. The instruments have added considerably to the flying capability and safety of aircraft. However, with increased sophistication of instrumentation, the cost and value of the instruments mounted in even small, private aircraft control panel have escalated.

With the increased number and value of the different aircraft flight instruments now used in private aircraft, aircraft instrumentation has become an increasingly attractive target for thievery. While the cockpit doors of private aircraft are equipped with locks, the types of locks employed for this purpose are quite insecure. Thus, it is a relatively easy matter for an accomplished thief to pick or break the lock of an aircraft cockpit door, enter the cockpit, and remove and steal flight instruments from the aircraft cockpit control panel. Each one of these instruments typically has a value on the order of $500.00, so that the loss of even a single instrument to the aircraft owner is not a trivial matter. Moreover, when a thief does break into an airplane cockpit, the thief will normally take as many of the most expensive instruments as possible. The total value of such instruments in a small, private aircraft is typically between about $3,000.00 and $10,000.00.

SUMMARY OF THE INVENTION

The present invention provides a system for safeguarding aircraft flight instruments mounted in the control panel in the cockpit of an aircraft. According to the system of the invention a guard or shield of unique configuration is employed to cover at least a considerable number of the aircraft instruments in the cockpit control panel. Due to its unique configuration, the guard shield may be locked into position relatively easily so that it cannot be removed by unauthorized persons to expose the aircraft control panel.

The unique shield of the invention fits onto the pilot and copilot steering columns in an aircraft, and is secured in position by means of a locking arrangement that engages the throttle control which protrudes out of the plane of the control panel in a private aircraft cockpit. The guard shield of the invention can be fabricated from any suitable stiff material such as aluminum, fiberglass, plastic, or heavy leather.

The guard shield of the invention serves first to conceal at least some of the instruments in the control panel from view by an observer peering into the cockpit through the windows thereof. Thus, a prospective thief cannot readily determine precisely what instruments are mounted in the cockpit control panel behind the shield. Also, the shield serves as a deterrent to a potential thief since it is quite evident that removal of instruments from a cockpit employing a shield according to the invention can only be performed with considerable difficulty, thus greatly increasing the time that would be required to gain access to the instruments and thus the likelihood that the theft will be detected and foiled.

A further object of the invention is to provide an instrument shield which is not excessively heavy and bulky, and which can be conveniently stored in the aircraft during flight so that it is available for use upon landing at unattended airports and airstrips.

A further object of the invention is to provide a theft deterrent system for an aircraft which is not inordinately complex and which may be installed and removed from a position concealing the instruments quickly and easily by one possessing a key to the locking mechanism employed in the system of the invention.

In one broad aspect the invention may be considered to be a guard shield for aircraft instruments installed in an instrument panel in the cockpit of an aircraft having a pair of parallel steering columns for pilot and copilot seats and wherein a throttle rod projects outwardly from the instrument panel. The shield of the invention is comprised of a flat, laterally expansive, rigid plate having upper and lower edges. The shield includes a pair of parallel slots defined in its lower edge and extending therefrom upwardly into the interior of the plate. The slots have ends that terminate within the plate. The slots are spaced laterally from each other a distance equal to the distance of separation between the steering columns. The shield further includes an enclosed aperture in the plate positioned in alignment to receive the throttle control therethrough when the plate is seated such that the steering columns reside at the ends of the slots.

The steering columns for the pilot and copilot steering mechanisms serve as supports which hold the shield in position in vertical alignment to cover at least a major portion of the instrument panel. Since the throttle control projects through an enclosed opening, a locking mechanism can be attached to the protruding end of the throttle control to prevent the shield from being pulled along the steering columns away from the instrument panel. To the contrary, the locking mechanism holds the plate within an inch of the face of the instrument panel.

The plate used to form the shield is preferably fabricated from three-eighths inch aluminum, although a shield lighter in weight can be formed of plastic. The plate of the shield is preferably at least about twenty-four inches in width and further defines openings therein positioned to receive a fuel control and a control for the aircraft flaps, since both of these controls likewise project out of the face of the instrument panel. The fuel control and the control for the aircraft flaps project through openings that are defined in the plate.

In another broad aspect the invention may be considered to be, in combination, an aircraft cockpit having an instrument panel with aircraft instruments mounted therein and with pilot and copilot steering columns and a throttle control projecting outwardly therefrom, a guard shield, and a lock mechanism. The guard shield is formed as a flat, laterally expansive, rigid plate having upper and lower edges and including a pair of parallel slots defined in the lower edge. The slots extend from the lower edge upwardly into the interior of the plate. The slots have blind ends that terminate within the plate. The slots are spaced laterally from each other a distance equal to the distance of separation of the steering columns. An enclosed throttle control receiving aperture is also defined in the plate. The guard shield is disposed immediately in front of the instrument panel such that the steering columns reside in the blind ends of the slots and the throttle control protrudes through the throttle control receiving aperture in the plate. The lock mechanism may engage either the throttle control or the steering columns. If it engages the throttle control it is larger than the throttle control receiving aperture and is secured to the throttle control. The instruments are thus concealed from view and rendered inaccessible to unauthorized personnel.

A conventional throttle control in a small, private aircraft, typically includes a rod projecting from the instrument panel. The rod has a distal end with an enlarged knob thereon. In conventional practice throttle guards are employed to prevent the theft of an aircraft. These conventional throttle guards are typically formed of a steel cylinder having an open end which receives the throttle control rod and an opposite, transverse end closure which covers the knob. A side opening is typically formed in the wall of the cylindrical throttle guard cover between the open end and the end closure. A padlock, which may be either a key operated lock or a combination operated lock, is conventionally employed to hold the throttle guard onto the throttle control. The padlock has a shackle which is disposed in the side opening of the cylindrical throttle guard wall. The shackle passes around the rod between the knob and the face of the instrument panel. A crosspiece is secured to the shackle and protrudes radially beyond the cylindrical wall of the throttle guard.

A conventional throttle guard of this type is employed to guard against theft of the aircraft. That is, when the throttle guard is locked onto the throttle control with the throttle control pulled out away from the instrument panel, the throttle cannot be operated and the aircraft therefore cannot be flown. However throttle guards have heretofore not been used to in any way protect instruments in the aircraft cockpit control panel from theft.

According to the present invention, the same throttle guard that is conventionally used to protect an aircraft from theft may be employed to advantage as a locking mechanism in securing the shield of the invention in position to protect the instruments in the cockpit control panel. That is, once the shield has been seated so as to rest upon the steering columns with the steering columns residing in the blind ends of the slots and pressed against the face of the instrument panel so that the throttle control protrudes through the plate, the conventional throttle guard is placed upon the protruding end of the throttle.

The open end of the throttle guard thereupon bears against the exposed surface of the plate of the shield immediately around the throttle control receiving aperture therein. With a padlock in position so that the padlock shackle captures the throttle rod, the throttle guard not only prevents the throttle from being pushed in, and thus prevents the aircraft from being flown, but the throttle guard also holds the guard shield of the invention closely adjacent to the instrument panel and prevents it from being pulled out away from the aircraft instrument control panel.

The guard shield of the invention does not depend upon use of a conventional throttle guard, however. To the contrary, other locking mechanisms may be employed to prevent the shield from being pulled away from the aircraft instrument control panel. For example, a padlock may be secured about the control rod between the knob on the distal end thereof and the exposed surface of the guard shield plate. The padlock must be larger than the throttle control receiving opening in the plate. Thus, the plate of the guard shield cannot be pulled very far away from the instrument control panel, since the padlock prevents the shield from being drawn outwardly past the throttle knob.

In still another broad aspect the invention may be considered to be a method of safeguarding instruments mounted in a control panel of an aircraft in which pilot and copilot steering columns and a throttle control project from the control panel. The method utilizes a guard shield formed as a flat, laterally expansive, rigid plate having upper and lower edges and including a pair of parallel slots defined in the lower edge. The slots extend from the lower edge upwardly into the interior of the plate. The slots have blind ends that terminate in the plate and are spaced laterally from each other a distance equal to the distance of separation of the steering columns. The plate also defines an enclosed throttle receiving aperture therewithin.

According to the method of the invention the guard shield is positioned closely adjacent to the aircraft instrument control panel and is rested upon the steering columns such that the steering columns project through the slots at the blind ends thereof and such that the throttle control projects through the throttle control receiving aperture. The guard shield is then locked into position adjacent to the instrument panel. This may be done by securing a lock mechanism larger than the throttle control receiving aperture to the throttle control. Alternatively, a locking mechanism located between the guard shield plate and the instrument panel and which engages the steering columns may be employed.

The invention may be described with greater clarity and particularity by reference to the accompanying drawings.

DESCRIPTION OF THE EMBODIMENTS AND IMPLEMENTATION OF THE METHOD

Figure 1:
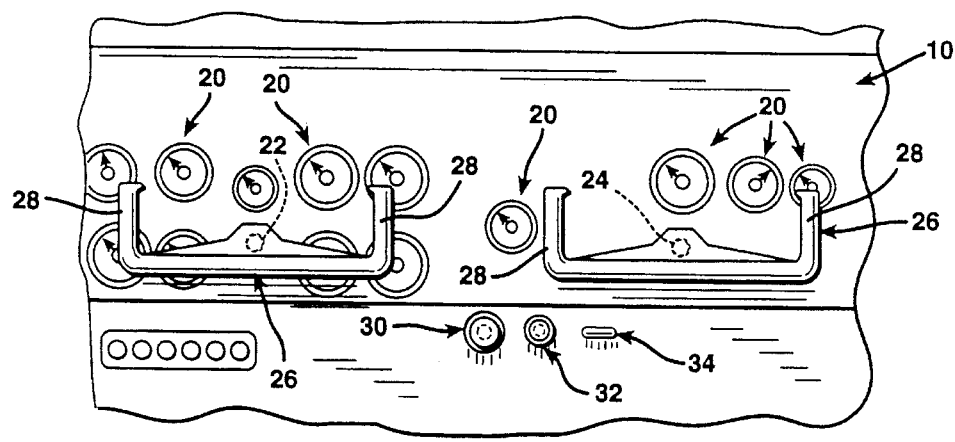
FIG. 1 is a elevational view of a typical control panel in the cockpit of a private aircraft.

FIG. 1 is an elevational view looking forward in the cockpit of a small Cessna Piper aircraft toward the control panel 10 thereof as viewed from between the pilot and copilot seats. As illustrated, the control panel 10 includes a number of flight instruments 20 mounted therein. The instruments 20 include such flying instrumentation as a roll indicator, vertical speed indicator, compass, altimeter, fuel pressure gauge, tachometer, radio, and other types of gauges and instrumentation which are utilized in aircraft.

The cockpit of the aircraft also includes a pair of parallel steering columns, respectively indicated at 22 and 24. The steering columns 22 and 24 project rearwardly from the control panel 10 toward the pilot and copilot positions, respectively. Each of the steering columns 22 and 24 terminates in a steering yoke 26, each of which has a pair of laterally spaced handgrips 28 by means of which the pilot or copilot can steer the aircraft.

The instrument panel 10 also has a throttle control 30 projecting outwardly and rearwardly therefrom at a location between and slightly beneath the level of the steering columns 22 and 24. The throttle control 30 is illustrated in detail in FIG. 6 and is of a conventional construction in which a metal rod 68 projects outwardly from the instrument panel 10 in a rearwardly direction. The rod 68 has a distal end with an enlarged knob 70 permanently mounted thereon. Also, to the right of the throttle control 30, as viewed in FIG. 1, there is a fuel mixture control 32 and a flaps control 34, both of which likewise project outwardly and rearwardly from the instrument control panel 10.

Figure 2:
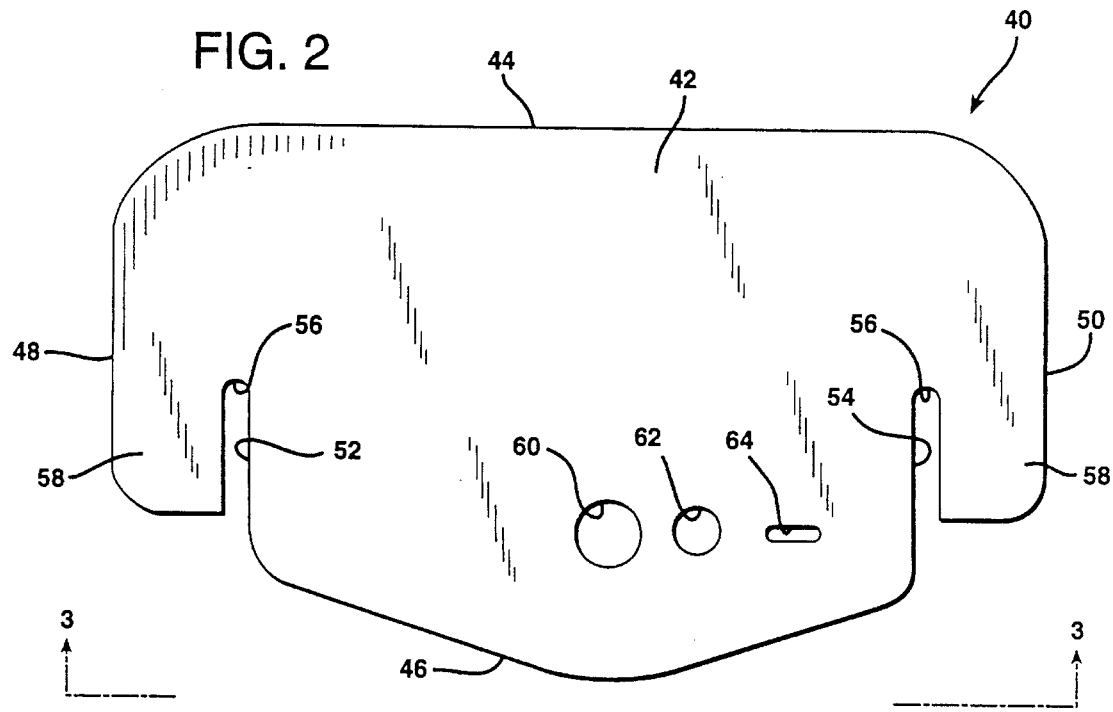
FIG. 2 is an elevational view of a guard shield according to the invention designed to protect the control panel instruments in the cockpit control panel of FIG. 1.
Figure 3:
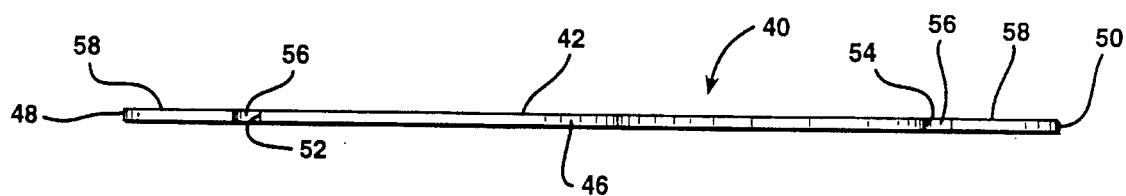
FIG. 3 is a lower edge view of the guard shield of FIG. 2.

FIGS. 2 and 3 illustrate one embodiment of an instrumentation guard shield 40 according to the invention in isolation. As shown, the guard shield 40 is fabricated of a three-eighths inch thick flat, laterally extensive, rigid, aluminum plate 42 having an upper edge 44 and a lower edge 46. The upper edge 44 is generally straight and extends horizontally across the breadth of the plate 42 and curves downwardly at its ends at a transition with the straight, parallel, vertical side edges 48 and 50. The lower edge 46 is formed in a shallow, V-shaped configuration and has a pair of mutually parallel slots 52 and 54 defined therein parallel to the side edges 48 and 50.

The slots 52 and 54 extend from the lower edge 46 upwardly into the interior of the plate 42 and terminate at blind ends 56 within the plate 42. The slots 52 and 54 define a pair or outboard wings 58 at the lower and outer extremities of the plate 42. The slots 52 and 54 extend into the interior of the plate 42 from the lower edge 46 a distance of about four and a half to five inches and are each about three-quarters of an inch in width. The interior edges of the slots 52 and 54 are about twenty-four inches from each other.

The plate 42 also defines within its structure three apertures for three controls which protrude outwardly from the cockpit instrument panel 10. Specifically, a circular aperture 60 is defined in the structure of the plate 42 to accommodate the outward, rearward projection of the throttle control 30. The aperture 60 is preferably about two inches in diameter. About seven-eighths of an inch to the right of the aperture 60 there is another circular aperture 62 having a diameter of about one and a half inches. The aperture 62 is aligned to receive the outwardly and rearwardly projecting fuel mixture control 32. About one and one-eighths inches to the right of the aperture 62 there is a narrow, horizontally oriented, enclosed aperture 64 about one and one-quarter inches in length and about one-half inch in width. The aperture 64 receives the flaps control 34 that projects outwardly and rearwardly from the control panel 10 next to the fuel mixture control 32 in a Cessna Piper.

Figure 4:
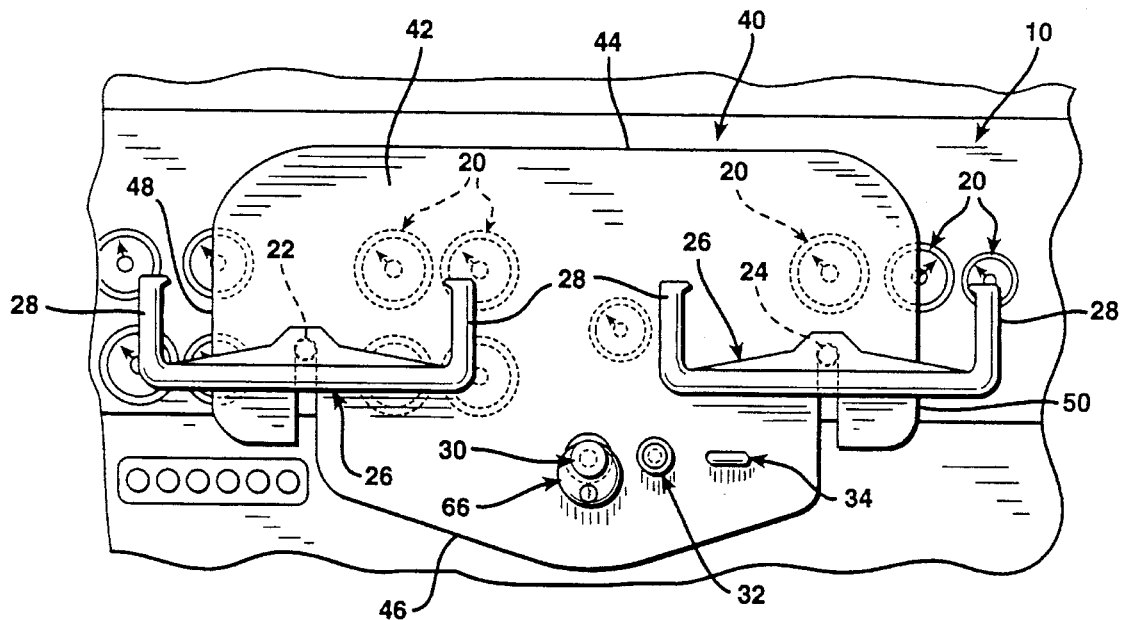
FIG. 4 illustrates the guard shield of the invention disposed in position to cover instruments in the control panel of FIG. 1 utilizing a simple padlock.

The guard shield 40 is used to cover the instruments 20 in the instrument panel 10 in the manner illustrated in FIG. 4. As shown in FIG. 4 the guard shield 40 is disposed directly in front of the instrument panel 10. When it is installed it resides within one-half inch of the face of the instrument panel 10. The guard shield 40 is moved into position in front of at least some of the instruments 20 by placing it above the steering columns 22 and 24 such that the slots 52 and 54 are respectively vertically aligned therewith, and lowering the guard shield 40 so that the steering columns 22 and 24 seat in the blind ends 56 of the slots 52 and 54, respectively. The guard shield 40 is lowered into position in this manner about four or five inches in front of the instrument panel 10. Once the guard shield 40 is seated atop the steering columns 22 and 24, it is pushed forwardly nearly flush up against the instrument panels 10.

As the guard shield 40 is pushed forwardly the throttle control 30, the fuel mixture control 32, and the flaps control 34 respectively pass through the apertures 60, 62, and 64, and project rearwardly beyond the rearwardly facing surface of the plate 42. The guard shield 40 must then be locked in place and held juxtaposed closely adjacent to the instrument panel 10 by some means. While the guard shield 40 does not totally cover the faces of all the instruments 20, it does cover a considerable portion of the instruments 20. The coverage achieved is sufficient to deter a thief from breaking into an aircraft in which the guard shield 40 is installed.

In FIG. 4 the locking mechanism is simply a disc type padlock 66. Such a lock is formed in a generally hollow, disc-shaped configuration having a radial indentation therein. The shackle is an arcuately curved case hardened steel rod that can be rotated by means of a key through an arc in a pocket at the periphery of the disc-shaped body to either an open position in which the lock body can be laterally withdrawn from the throttle control 30, or a closed position in which the shackle extends across the periphery of the indentation, thereby capturing the throttle control 30 within the indentation in the case. One such lock is sold commercially as the Diskus 24 ST/70 mm by the Abus Lock Company located in Volmarstein, Germany. The body of the padlock 66 is bigger in diameter than the opening 60 in the guard shield 40 so that it cannot pass through the opening 60. The knob at the end of the throttle control 30 is big enough so that the padlock 66 cannot be pulled off of the end of the throttle control 30.

In the embodiment of FIG. 4 no throttle guard is employed. Rather, the shackle of the lock 66 simply passes over the throttle rod 68. The opening enclosed within the shackle of the lock 66 is too small to allow the knob 70 of the throttle control 30 to pass therethrough. Therefore, the guard shield 40 can be pulled out away from the surface of the instrument panel 10 to only a very limited extent. The distance is governed by the length of the rod 68, but in any event is too short to allow a thief access to the instruments 20 concealed in front of the guard shield 40.

Figure 5:
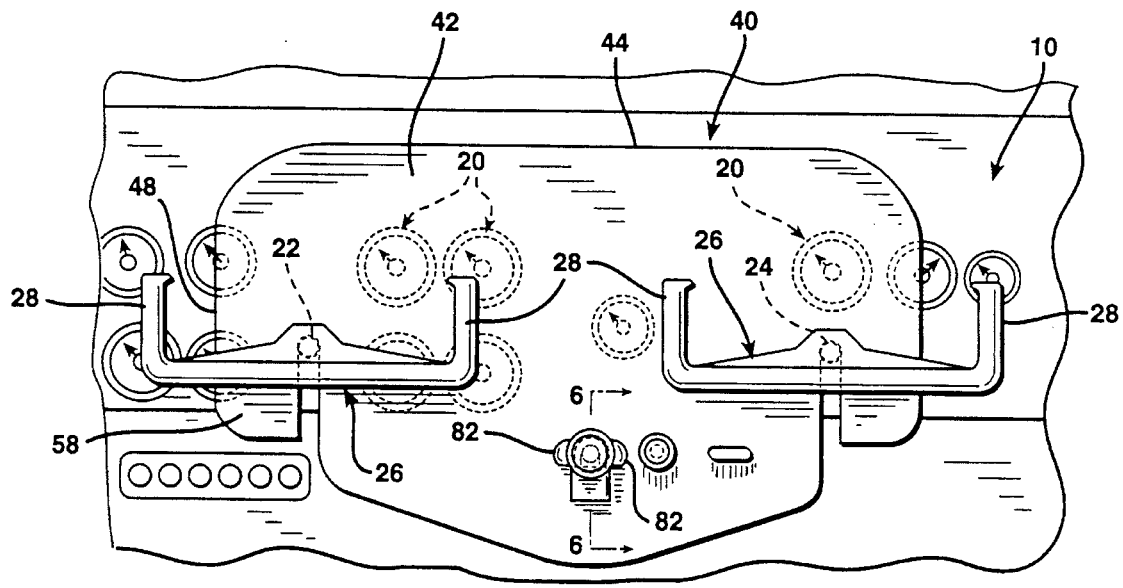
FIG. 5 is a elevational view illustrating the guard shield employed to protect instruments in the control panel of FIG. 1 utilizing both a throttle guard and a padlock.
Figure 6:
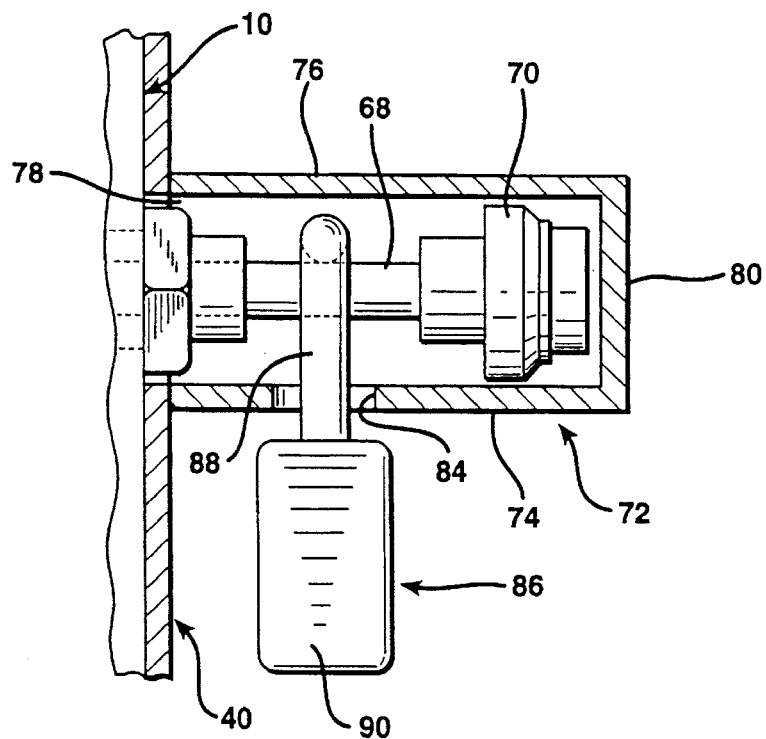
FIG. 6 is a side sectional detail taken along the lines 6—6 of FIG. 5.

The locking mechanism employed with the guard shield 40 may also include a throttle guard 72, as illustrated in FIGS. 5 and 6. The throttle guard 72 is comprised of a steel cylinder 74 having a wall 76 with an outer diameter of about three inches, which is larger than the diameter of the throttle receiving aperture 60. The cylinder 74 has a open end 78 which receives the throttle control rod 68 and an opposite, transverse disc-shaped end closure 80 which covers the knob 70. A pair of laterally directed flanges 82 extend laterally outwardly from and are welded to the cylindrical wall 76 as illustrated in FIG. 5. Beneath the flanges 82 there is a side opening 84 in the wall 76 between the open end 78 and the end closure 80 of the cylinder 74.

In addition to the throttle guard 72, the locking mechanism employed in the combination shown in FIGS. 5 and 6 includes a padlock 86 having a U-shaped shackle 88 and a crosspiece 90 secured to the shackle 88. The padlock 86 is a conventional padlock in which one end of the shackle 88 is permanently captured within the crosspiece body 90. When released by a key the shackle 88 is drawn away from the body 90 so that a free leg of the shackle can be inserted through the opening 84 in the side of the cylindrical wall 76 of the throttle guard 72 and passed about the throttle rod 68. The shackle 88 is then pushed back and locked into the crosspiece body 90 so that the shackle 88 captures and encircles the throttle rod 68. The structure of the lock 86 protrudes radially outwardly through the opening 84 in the throttle guard cylinder 74 and beyond the cylindrical wall 76 thereof.

As illustrated in FIG. 6, the throttle guard 72 is disposed so that the open end 78 thereof is flush against the rearwardly, exposed surface of the guard shield 40 once the guard shield 40 has been mounted on the steering columns 22 and 24 in the manner previously described. The padlock 86 is unlocked, thereby exposing the free leg of the shackle 88. The free leg of the shackle 88 is then inserted into the opening 84 and passed over and around the throttle rod 68 and back out through the opening 84. The crosspiece body 90 is then pushed toward the shackle 88, thereby capturing the free leg thereof and locking the lock in a conventional manner. The area enclosed by the shackle 88 is smaller than the knob 70.

As is evident from FIG. 6, as long as the padlock 86 remains locked, the guard shield 40 will remain in position in juxtaposition against the face of the instrument panel 10. The steel cylinder 74 of the throttle guard 72 bears against the exposed, rearwardly facing surface of the flat plate 42 and the opening defined within the loop of the shackle 88 is small enough so that the shackle cannot be pulled outwardly beyond the end of the throttle control knob 70. Thus, the guard shield 40 is held closely adjacent to the instrument panel 10 so that it can be moved no more than one-half inch away from the instrument panel 10. The flanges 82 serve to protect the shackle 88 and prevent the jaws of a bolt cutter from reaching the shackle 88.

Figure 9:
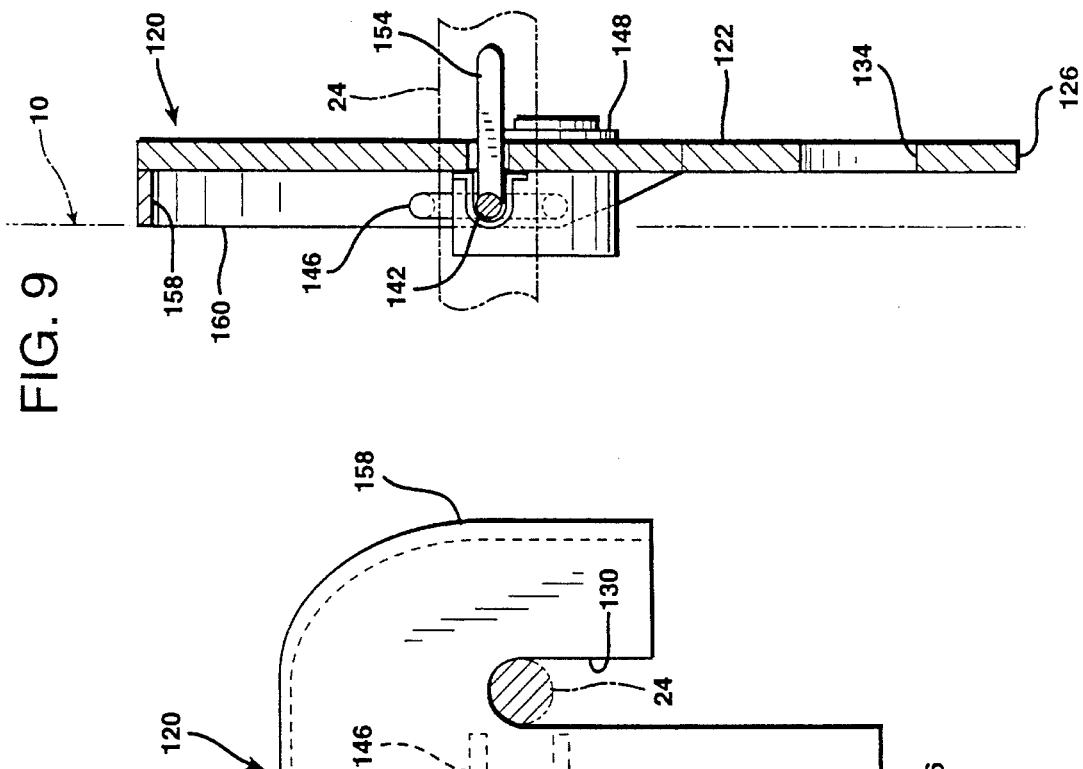
FIG. 9 is a sectional elevational view showing the guard shield of FIG. 8 in position in front of an instrument panel.
Figure 8:
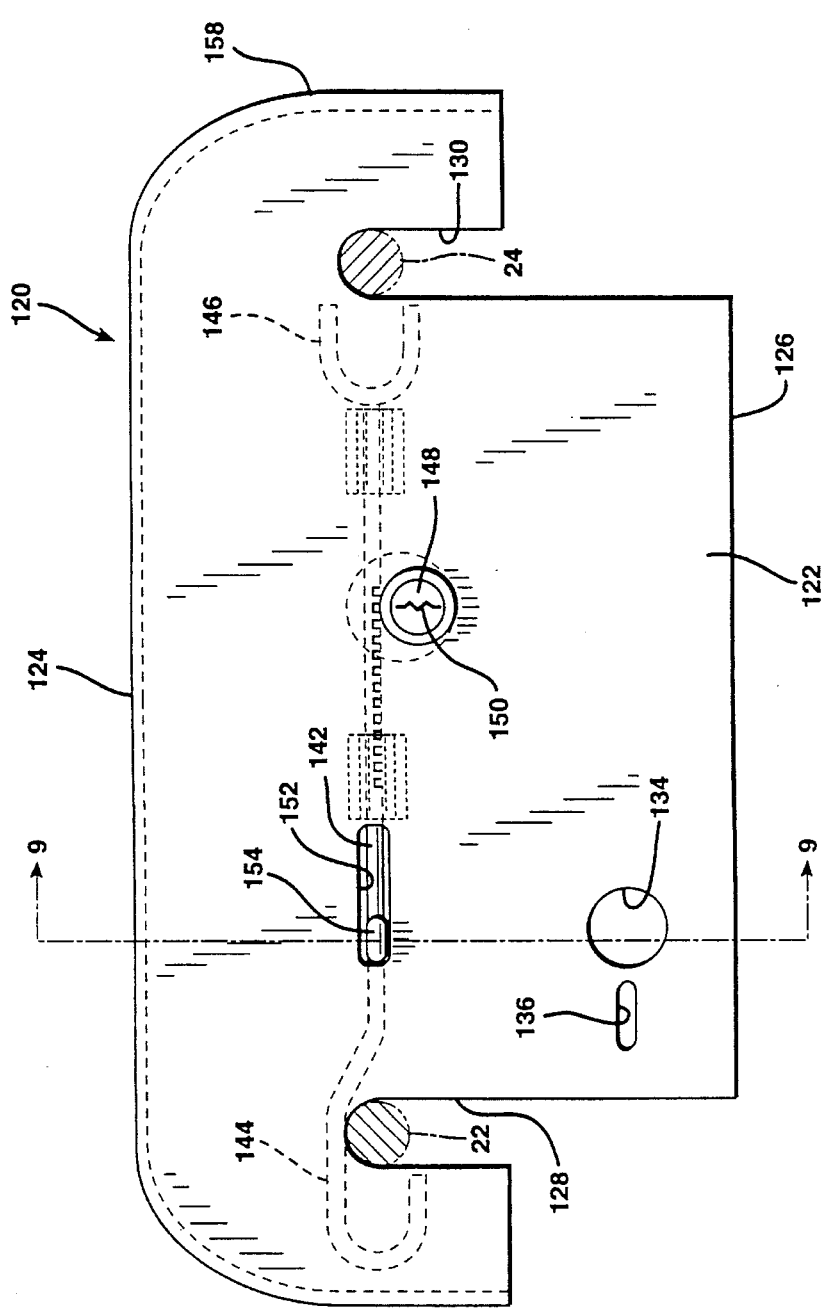
FIG. 8 is a front elevational view of another alternative embodiment of the guard shield according to the invention.
Figure 10:
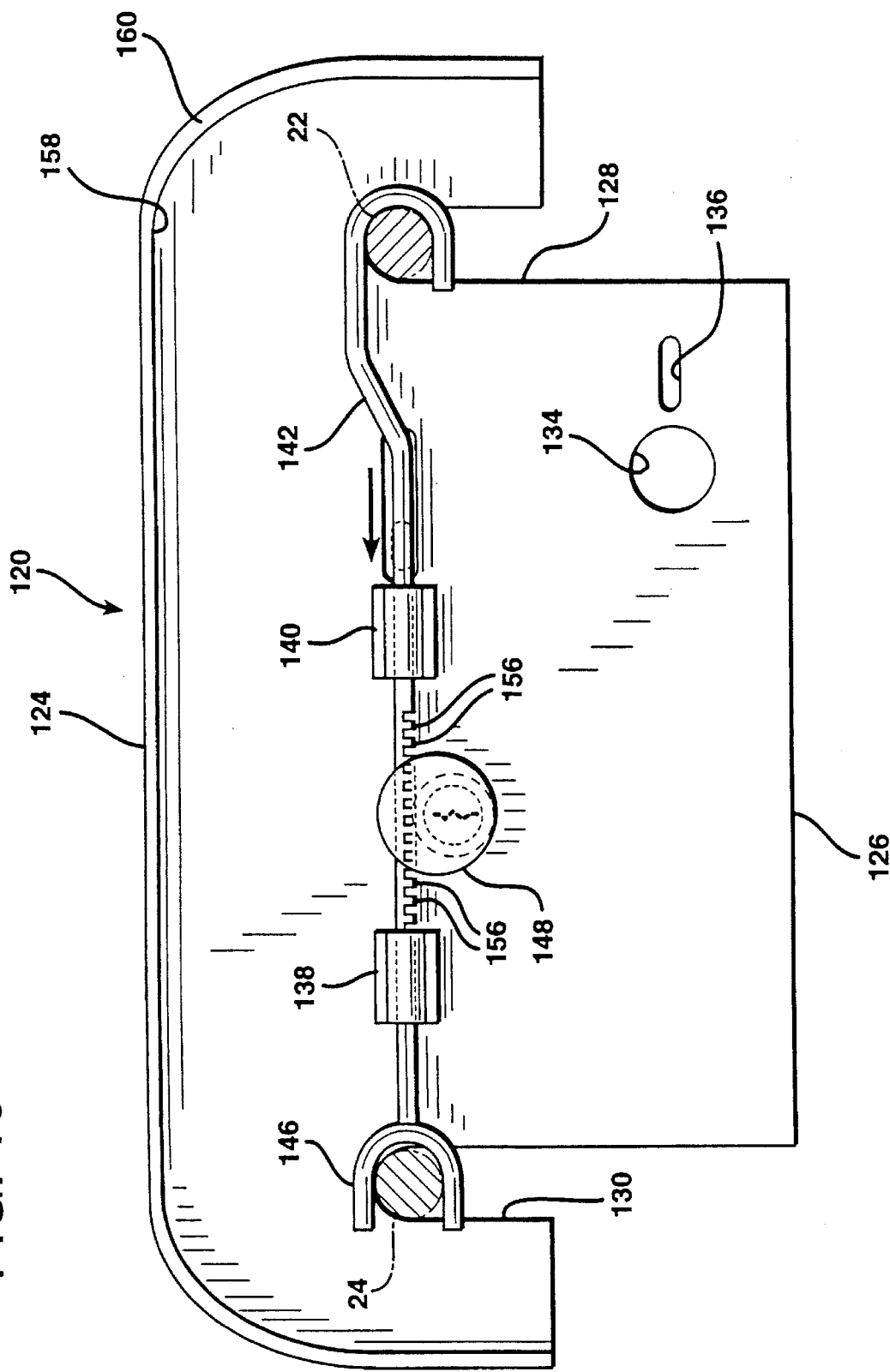
FIG. 10 is a rear elevational view of the guard shield of FIG. 8.

FIGS. 8, 9, and 10 illustrate another embodiment of a guard shield constructed according to the invention and indicated at 120. The guard shield 120 is formed of a plate 122 configured in a manner similar to the plate 42 but having certain geometric distinctions therefrom, since the guard shield 120 is designed for use on a different aircraft. Like the plate 42, the plate 122 is configured with a top edge 124, a bottom edge 126, and a pair of mutually parallel slots 128 and 130 formed in the lower edge 126. The slots 128 and 130 likewise receive the steering columns 22 and 24 therewithin, as illustrated in FIGS. 8 and 10.

The plate 122 has openings 132 and 134 for receiving the throttle control and flaps control that project forwardly out of the face of an instrument panel 10. However, the openings 134 and 136 are positioned at different locations to accommodate a different aircraft instrument panel control placement.

On the side of the plate 122 which faces the instrument panel 10 and which is visible in the view of FIG. 10, the guard shield 120 is provided with a pair of laterally spaced guide sleeves 138 and 140 which are at substantially the same distance from the lower edge 126 of the plate 122 as the blind ends of the slots 128 and 130. The guide sleeves 138 and 140 are configured to accommodate and guide in longitudinally reciprocal movement a locking member which is a solid tempered steel rod 142. At one of its ends the tempered steel cod 142 is provided with a hook-shaped crook 144 which extends beyond the slot 128. At its opposite end the rod 142 is configured with a fork 146 as the extremity of the rod 142 remote from the hook 144.

The rod 142 is engaged with a key actuating throw member on the back side of a key operated actuating cylinder member 148, best illustrated in FIG. 8. The interior construction of the lock mechanism of the cylinder 148 is conventional and is of the type often used for locking doors. The cylinder 148 is actuated by a key that is inserted into a keyhole 150. When a key is inserted into the keyhole 150 and twisted within the cylinder 148, it operates a throw member on the opposite side of the plate 122 that moves the steel rod 142 in a reciprocal fashion, much in the manner of operation of the bolt of a lock on building door.

When the key is inserted into the keyhole 150, rotation of the key in one direction will cause the locking rod 142 to slide longitudinally within the guide sleeves 138 and 140 to bring the hook 144 into engagement with the pilot steering column 22 and the fork 146 into engagement with the copilot steering column 24. When actuated to this locked position, shown in FIG. 10, the tip of the hook 144 passes beneath the steering column 22, while the lower leg of the fork 146 passes beneath the steering column 24. The hook 144 and the fork 146, in combination with the structure of the blind ends of the slots 128 and 130, thereby securely hold the guard shield 120 in position closely adjacent to the instrument panel 10.

When the key is twisted in the keyhole 150 in the opposite direction, the rod 142 is withdrawn from the locked position depicted in FIG. 10 to the released position depicted in FIG. 8. In the released position the fork 146 is withdrawn laterally out of vertical alignment with the slot 130 while the hook 144 is likewise drawn laterally out of alignment with the slot 128. With the rod 142 in the released position shown in FIG. 8, the guard shield 120 can be removed from in front of the instrument panel 10. On the other hand, when the locking rod 142 is in the locked position shown in FIG. 10, the guard shield 120 is held in position on the steering columns 22 and 24.

The throw member of the lock cylinder 148 is of the type that permits the locking rod 142 to be moved from the released to the locked position without using a key, although the converse is not true. This facilitates installation of the guard shield 120. To this end the plate 122 is provided with a narrow, elongated slot 152 which lies perpendicular to the orientation of the slots 128 and 130 and in registration with the locking rod 142. A small tab-shaped latching handle 154 is welded to the locking rod 142 and projects through the opening 152 in the structure of the plate 122 so that it is accessible from the front side thereof as illustrated in FIG. 8.

Near the lock cylinder 148 the locking rod 142 is provided with a plurality of teeth 156. The configuration of the throw arm of the lock cylinder 148 is such that the throw arm is spring biased to permit the teeth 156 on the locking rod 142 to cam past the cylinder throw arm when the locking rod 142 is moved from the released position shown in FIG. 8 to the locked position shown in FIG. 10. Thus, once the guard shield 120 is in position in front of the instrument panel 10, the user need merely press the handle 154 laterally from left to right, as viewed in FIG. 8, to bring the hook 144 and the fork 146, respectively, into engagement with the steering columns 22 and 24.

However, the teeth 156 are oriented such that they will not cam past the locked cylinder throw element if force is exerted in the opposite direction on the handle 154. To the contrary, the teeth 156 will remain firmly engaged in the lock mechanism until or unless the lock cylinder 148 is unlocked using a key.

Because there is a certain amount of longitudinal play along the lengths of the steering columns 22 and 24 with the guard 120, the flat plate 122 thereof is provided with a protective rim 158 that extends from the back side of the plate 122 facing the instrument panel 10 at least partially about the perimeter of the plate 122 to block access to the locking rod 142 from the sides of the guard shield 120. Specifically, rim 158 extends across the top edge 124 and down the side edges of the plate 122 as illustrated in FIG. 9 and 10. The rim 158 extends forwardly from the front side of the plate 122 a distance sufficient so that the back side of the plate 122 resides in abutment against the forward sides of the yokes 26. As a consequence, when the guard shield 120 is installed on the steering columns 22 and 24, the edge 160 of the rim 158 resides in contact with the outwardly facing surface of the instrument panel 10. The guard shield 120 is thereby held immovably fixed in position against the instrument panel 10 until released by use of a key in the keyhole 150.

Figure 7:
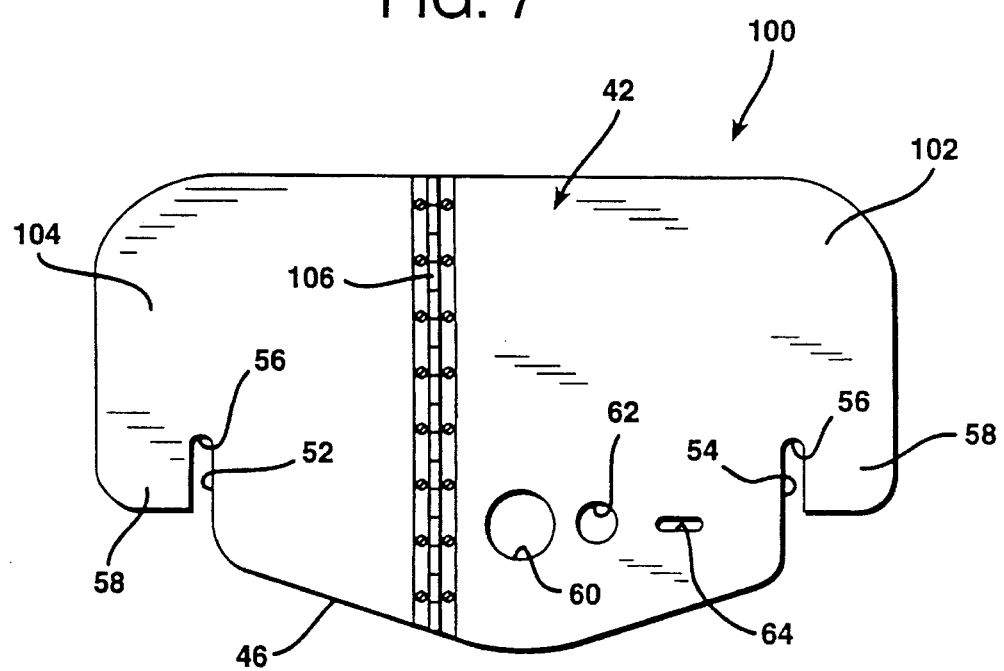
FIG. 7 illustrates an alternative embodiment of a guard shield according to the invention.

Other modifications of the invention are also possible. For example, FIG. 7 illustrates a guard shield 100 in which the plate 42' is formed of two leaves 102 and 104 which are hinged together by an elongated hinge 106. The hinge 106 is preferably fastened to the leaves 102 and 104 by rivets or some other non-removable type of fastener. The use of the hinge 106 allows the two leaves 102 and 104 to be folded together to facilitate storage of the guard shield 100 when the aircraft is in use.

Other modifications to the guard shield are also possible. The particular geometric shape of the outer perimeter of the guard shield and the spacing and dimensions of the slots for the steering columns and the openings for the throttle, fuel mixture control, and flaps control in the embodiment illustrated in FIGS. 2–5 are optimum for a Cessna Piper aircraft. However, the cockpit configurations of other aircraft will make other geometric shapes, slot positions and dimensions, and aperture sizes and locations more suitable.

Also, the plate forming the guard shield may be initially equipped with knockout slugs to allow a single guard shield to accommodate different aircraft. That is, a number of circular areas may be partially punched through the structure of the plate of the guard shield of the invention at locations corresponding to the different positions of controls which project outwardly and rearwardly from the aircraft control panel. These can be designated by indicia on the knockout areas on the reverse side of the panel. The user can then merely strike the weakened circular area with a hammer or other blunt instrument in order to create the requisite circular openings in the plate to accommodate the positions of controls projecting from the control panel in the particular aircraft involved.

Undoubtedly, numerous other variations and modifications of the invention will become readily apparent to those familiar with the design of private aircraft. Accordingly, the scope of the invention should not be construed as limited to the specific embodiments and method of implementation described herein.

What is claimed is:

1. In combination, an aircraft cockpit having an instrument panel with aircraft instruments mounted therein and with pilot and copilot steering columns, and also including a throttle control projecting outwardly therefrom which includes a rod projecting from said instrument panel and having a distal end with an enlarged knob thereon, a guard shield including a flat, laterally expansive rigid plate having upper and lower edges, and wherein said guard shield includes an enclosed throttle control receiving aperture defined in said plate, and a pair of parallel slots defined in said lower edge and extending therefrom upwardly into the interior of said plate, and wherein said slots have blind ends that terminate within said plate, said slots being spaced laterally from each other a distance equal to the distance of separation of said steering columns, wherein said guard shield is disposed immediately in front of said instrument panel such that said steering columns reside in said blind ends of said slots and said throttle control protrudes through said throttle control receiving aperture in said plate, and a lock mechanism that secures said shield in position immediately in front of said instrument panel, and said lock mechanism is comprised of a padlock secured to said throttle control and having a shackle that passes around said rod between said knob and said shield and a crosspiece secured to said shackle, and wherein said padlock is larger than said throttle control receiving aperture.

2. A combination guard shield according to claim 1 wherein said plate is at least about twenty-four inches in width.

3. A combination guard shield according to claim 1 wherein said plate further defines openings therein positioned to receive a fuel control and a control for aircraft flaps projecting therethrough.

4. A combination guard shield according to claim 1 wherein said plate is formed of a plurality of sections hinged together.

5. A combination guard shield according to claim 1 wherein said slots are separated from each other by a distance of about sixteen and a half inches.

6. In combination, an aircraft cockpit having an instrument panel with aircraft instruments mounted therein and with pilot and copilot steering columns, and also including a throttle control projecting outwardly therefrom which includes a rod projecting from said instrument panel and having a distal end with an enlarged knob thereon, a guard shield including a flat, laterally expansive rigid plate having upper and lower edges, and wherein said guard shield includes an enclosed throttle control receiving aperture defined in said plate and a pair of parallel slots defined in said lower edge and extending therefrom upwardly into the interior of said plate, and wherein said slots have blind ends that terminate within said plate, said slots being spaced laterally from each other a distance equal to the distance of separation of said steering columns, wherein said guard shield is disposed immediately in front of said instrument panel such that said steering columns reside in said blind ends of said slots and said throttle control protrudes through said throttle control receiving aperture in said plate, and a lock mechanism that secures said shield in position immediately in front of said instrument panel, and said lock mechanism is comprised of a steel cylindrical wall of a diameter larger than said throttle receiving aperture having an open end which receives said throttle control rod and an opposite end closure which covers said knob, and a side opening in said wall between said open end and said end closure, and a padlock secured to said throttle control and which is larger than said throttle control receiving aperture having a shackle that is disposed in said side opening wherein said shackle passes around said rod between said knob and said shield and a crosspiece secured to said shackle and protruding radially beyond said cylindrical wall.

* * * * *